(12) United States Patent
Tordini

(10) Patent No.: US 8,752,994 B2
(45) Date of Patent: Jun. 17, 2014

(54) ILLUMINATION SYSTEM, LUMINAIRE AND DISPLAY DEVICE

(75) Inventor: Giorgia Tordini, Lyons (FR)

(73) Assignee: Koninklijke Philips N.V., Eindhoven (NL)

(*) Notice: Subject to any disclaimer, the term of this patent is extended or adjusted under 35 U.S.C. 154(b) by 556 days.

(21) Appl. No.: 13/120,325

(22) PCT Filed: Sep. 18, 2009

(86) PCT No.: PCT/IB2009/054090
§ 371 (c)(1),
(2), (4) Date: Mar. 22, 2011

(87) PCT Pub. No.: WO2010/035194
PCT Pub. Date: Apr. 1, 2010

(65) Prior Publication Data
US 2011/0170278 A1    Jul. 14, 2011

(30) Foreign Application Priority Data
Sep. 25, 2008 (EP) ..................................... 08165105

(51) Int. Cl.
*F21V 7/04* (2006.01)
(52) U.S. Cl.
USPC ........................................ 362/612; 362/628
(58) Field of Classification Search
USPC ............................................... 362/600–634
See application file for complete search history.

(56) References Cited

U.S. PATENT DOCUMENTS

| 3,497,687 | A | 2/1970 | Hermann | |
| 6,481,130 | B1* | 11/2002 | Wu | 362/297 |
| 8,231,256 | B1* | 7/2012 | Coleman et al. | 362/601 |
| 2003/0076034 | A1 | 4/2003 | Marshall et al. | |
| 2003/0099115 | A1 | 5/2003 | Reill | |
| 2007/0081329 | A1* | 4/2007 | Chua et al. | 362/231 |
| 2007/0081361 | A1 | 4/2007 | Clary | |
| 2007/0171676 | A1 | 7/2007 | Chang | |
| 2008/0291683 | A1* | 11/2008 | Chinniah et al. | 362/326 |
| 2009/0196071 | A1* | 8/2009 | Matheson et al. | 362/615 |

FOREIGN PATENT DOCUMENTS

| DE | 102005019832 A1 | 9/2006 |
| WO | 2007016363 A2 | 2/2007 |
| WO | 2007054889 A2 | 5/2007 |

* cited by examiner

*Primary Examiner* — William Carter
(74) *Attorney, Agent, or Firm* — Yuliya Mathis

(57) ABSTRACT

The invention relates to an illumination system (10), a luminaire (102), a collimator (30) and a display device (200). The illumination system according to the invention comprises a light source (20) and the collimator. The light source is configured for emitting a substantially Lambertian light distribution around a symmetry axis (22). The refractive collimator is configured for redirecting light from the light source to at least partially illuminate an illuminating surface (50) in which at least a part of the illuminating surface being substantially parallel to the symmetry axis. The refractive collimator comprises a concave input window (34) and an at least partially convex output window (40) for refracting light towards the illuminating surface.
The effect of the illumination system according to the invention is that a height of the illumination system may be reduced due to the use of the refractive collimator.

12 Claims, 5 Drawing Sheets

FIG. 4A
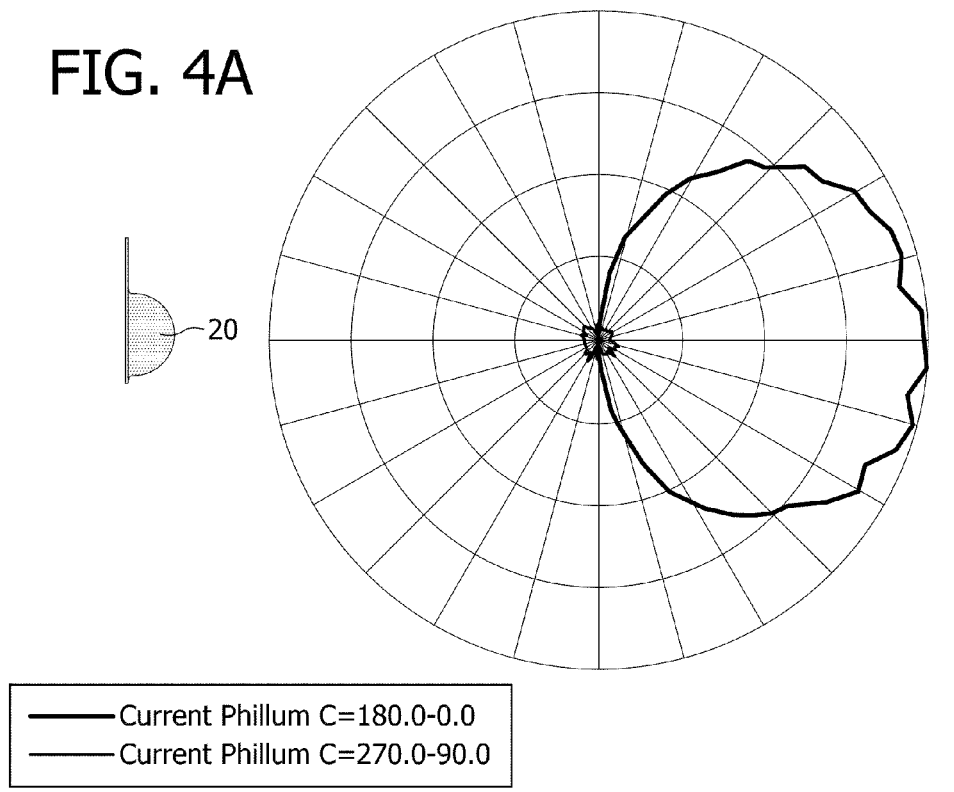
— Current Phillum C=180.0-0.0
— Current Phillum C=270.0-90.0
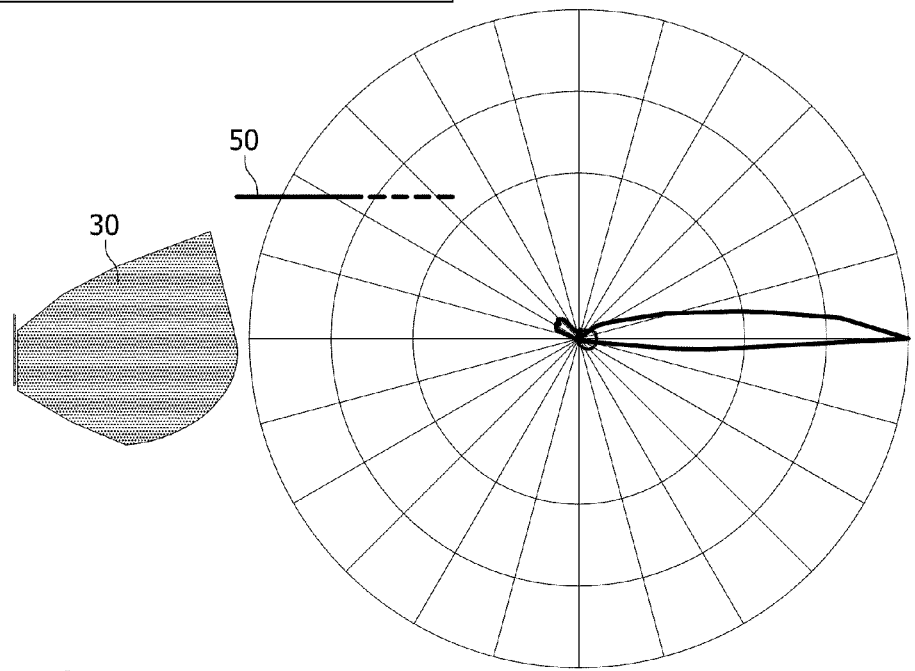
FIG. 4B

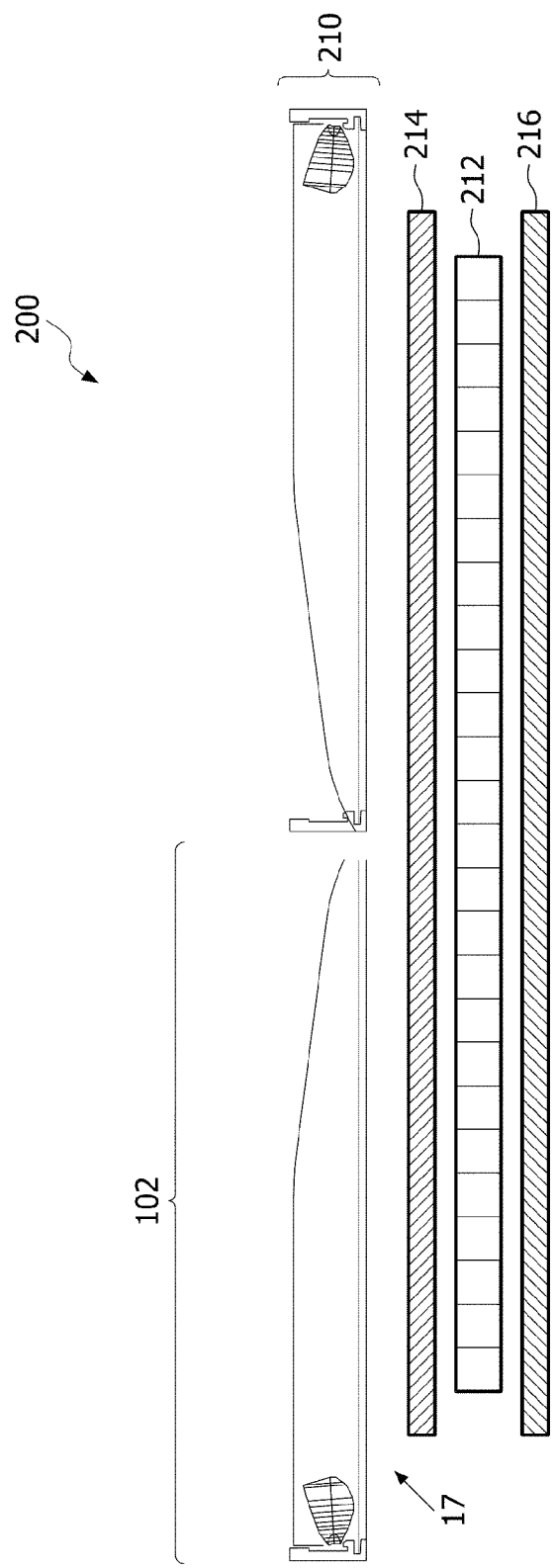

ILLUMINATION SYSTEM, LUMINAIRE AND DISPLAY DEVICE

FIELD OF THE INVENTION

The invention relates to an illumination system comprising a light source, and a collimator.

The invention also relates to a luminaire comprising the illumination system according to the invention. The invention also relates to a collimator for use in the illumination system according to the invention and/or in the luminaire according to the invention. The invention also relates to a display device comprising the luminaire according to the invention as a backlighting system.

BACKGROUND OF THE INVENTION

Such illumination systems are known per se. They are used, inter alia, in luminaires for general lighting purposes, for example, for office lights, for shop lights or, for example, for shop window lights. Alternatively these illumination system are used for lighting of (transparent or semi-transparent) plates of glass or of (transparent) plates of glass or of (transparent) synthetic resin on which items, for example jewelry, are displayed. Further alternatively the illumination system is used for illuminating advertising boards, for example, advertising boards illuminating a partially transparent image from the back of the image.

The known illumination systems may also be used as light sources in backlighting systems in (picture) display devices, for example, for TV sets and monitors. Such illumination systems are particularly suitable for use as backlighting systems for non-emissive displays such as liquid crystal display devices, also denoted LCD panels, which are used in (portable) computers or (portable) telephones.

Illumination system comprising a light source having a substantially Lambertian emission profile, for example, light emitting diodes (further also referred to as LEDs) are recently more frequently used in general lighting applications, such as luminaires. The benefit when using LEDs in luminaires is that the efficiency of the LEDs is relatively high. Furthermore, the range of available LEDs for use in general light applications is vast offering excellent design freedom in respect to emitted color and aesthetic design of the luminaire. A drawback of the use of LEDs is that the light emitting surface typically is relatively small and the intensity of light emitted from this relatively small surface is high. The shielding of this light emitting surface to a user of the luminaire is important to prevent glare. Glare results from excessive contrast between bright and dark areas in the field of view. Glare can, for example, result from directly viewing a filament of an unshielded or badly shielded light source. Especially when using LEDs, direct view into the LEDs by a user near the luminaire should be prevented to reduce the glare of the luminaire and increases the visual comfort of the user. A luminaire comprising LEDs as a light source is, for example, known from WO 2007/054889. In this luminaire the light emitted by the LEDs is emitted via a back-reflector to reduce the glare and improve the uniformity of the light emitted from the luminaire. A disadvantage of the known luminaire is that the height is relatively large.

SUMMARY OF THE INVENTION

It is an object of the invention to provide an illumination system having reduced height.

According to a first aspect of the invention the object is achieved with an illumination system claimed in claim 1. According to a second aspect of the invention, the object is achieved with a luminaire as claimed in claim 7. According to a third aspect of the invention, the object is achieved with a collimator as claimed in claim 14. According to a fourth aspect of the invention, the object is achieved with a display device as claimed in claim 15.

The illumination system according to the first aspect of the invention comprises a light source for emitting light with a basic emission distribution around a symmetry axis, and a collimator for redirecting light from the light source to substantially homogeneously illuminate at least a part of an illuminating surface at least a part of the homogeneously illuminated illuminating surface extending substantially parallel to the symmetry axis, the collimator comprising a concave input window for receiving light from the light source, and further comprising an at least partially convex output window for directing light towards the illuminating surface, a convex part of the output window being shaped for refracting light emitted by the light source in a direction away from the illuminating surface back towards the illuminating surface and for generating an altered emission distribution being asymmetric with respect to the symmetry axis of the basic emission distribution to substantially homogeneously illuminate the at least part of the illuminating surface.

An effect of the illumination system according to the invention is that the combination of the light source and the collimator enables the illumination system to substantially homogeneously illuminate at least a part of the illuminating surface which is arranged substantially parallel to the symmetry axis. Generally, the emission profile of a LED is substantially Lambertian. Such Lambertian emission profile from a light source does not result in a substantially uniform distribution of the light across an illuminating surface which is at least partially arranged parallel to the symmetry axis of the Lambertian emission profile. In the known illumination system a mirror is used to reflect light from the light source towards the illuminating surface. Such a mirror may, for example, be shaped such that the substantially Lambertian distribution of the LED is at least partially converted into a homogeneous distribution across the illuminating surface. However, the use of such a mirror typically enhances the dimensions of the illumination system. In the illumination system according to the invention, the use of the collimator generates an asymmetric emission profile which illuminates the illuminating surface substantially homogeneously, thus omitting the need for a mirror. As such, the height of the illumination system may be reduced.

The use of the collimator substantially improves the design freedom to obtain a substantially uniform illumination of the part of the illuminating surface. The collimator may be manufactured at relatively high accuracy, for example, using well known molding techniques. Especially the shape of the output window, which is partially used for refracting light back towards the illuminating surface, may relatively easy be produced in substantially any shape which significantly improves the design freedom compared to the known illumination system. In the known illumination system the shape of the mirror is often relatively difficult to make and may often require excessive height of the illumination system to generate the required light distribution which limits the design freedom in the known illumination system.

A further benefit when using the illumination system according to the invention which comprises a LED as light source, is that a base of the LED is arranged substantially perpendicular to the illuminating surface. Such an arrangement of the base of the LED enables to substantially fully illuminate the illuminating surface. In the known illumination system the base of the LED is substantially parallel to the illuminating surface. In such a known arrangement, the base of the LED typically generates a shadow at the illuminating surface (below the LED) which cannot be illuminated by the LED. When using the illumination system according to the invention, the arrangement of the LED enables the whole illuminating surface to be illuminated by the light of the LED. When the collimator is a refractive collimator, light may leak from the refractive collimate at different surfaces than the output window which generates stray-light. This stray-light may beneficially be used to illuminate the remainder of the illuminating surface.

An even further benefit when using a refractive collimator in the illumination system according to the invention is that the use of the refractive collimator improves the efficiency of the illumination system. In the known illumination system, a mirror is used to generate a substantially homogeneous light distribution. However, the use of the mirror generally introduces reflection losses which reduce the efficiency of the known illumination system. By using the refractive collimator in the illumination system according to the invention, the mirror may be omitted, thus preventing the reflection losses, and thus improving the efficiency of the illumination system according to the invention compared to the known illumination systems.

Collimators are often used to convert light from, for example, a Lambertian emission distribution into a substantially parallel beam of light. However, the emission distribution from the known collimators is typically not uniform, especially not when illuminating an illuminating surface arranged partially parallel to the symmetry axis of the Lambertian distribution. The collimator according to the invention comprises an at least partially convex output window for refracting light towards the illuminating surface. A shape of the at least partially convex output window is chosen such that an emission distribution is generated at the illuminating surface which is substantially homogeneous. This is achieved by the asymmetric emission distribution from the output window of the refractive collimator according to the invention which is obtained due to the at least partially convex output window of the collimator.

The shape of the at least partially convex output window may be determined using, for example, optical modeling software, also known as ray-tracing programs, such as ASAP®, lighttools®, etc.

The collimator is arranged such that in operation part of the illuminating surface is substantially homogeneously illuminated. At least a part of the illuminating surface is arranged substantially parallel to the symmetry axis of the emission profile of the light source. In the remainder of this text, the phrase "at least a part of the illuminating surface is arranged substantially parallel to the symmetry axis of the emission profile" means that there may be an angle between the symmetry axis of the emission profile of the light source and the part of the illuminating surface within a range of ±10 degrees. Preferably the illuminating surface is parallel to the symmetry axis of the emission profile of the light source. In such an arrangement the range over which the light spreads across the illuminating surface may be largest. In such a configuration, the base of the light source, for example, a LED, is arranged substantially perpendicular to the at least part of the illuminating surface. At a far end of the illuminating surface, relatively far away from the collimator, the illuminating surface may be curved slightly towards the symmetry axis to enable a uniform light distribution also at a relatively large distance from the collimator. Alternatively, the light source (together with the collimator) may be tilted over a relatively small angle, for example, up to 10 degrees towards the illuminating surface. Such a tilt of the light source and collimator generally requires an adaptation of the at least partially convex output window of the collimator to ensure a uniform light distribution across the illuminated part of the illuminating surface.

In an embodiment of the illumination system, the collimator comprises an edge-wall arranged between the input window and the output window, in between the input window and a boundary edge the edge-wall being arranged substantially symmetric around a further symmetry axis, and comprising a substantially parabolic shape in a cross-section through the further symmetry axis. A benefit of this embodiment is that when the collimator is a refractive collimator, the substantial parabolic shape of the edge-wall of the refractive collimator enables the guidance of the light through the refractive collimator via total internal reflection. Reflection inside the refractive collimator via total internal reflection is a substantially loss-less reflection, and thus the use of the substantial parabolic shape of the edge wall of the refractive collimator enables a substantially loss-less guidance of the light from the input window to the exit window.

In an embodiment of the illumination system, the further symmetry axis of the collimator and the symmetry axis of the emission distribution intersect substantially at a focal point of the concave input window, and wherein the further symmetry axis is tilted with respect to the symmetry axis of the emission distribution over a tilting angle. The tilting of the further symmetry axis is preferably towards the illuminating surface, thus tilting the parabolic edge-wall of the refractive collimator. A benefit of this embodiment is that the guidance via total internal reflection already progresses towards the illuminating surface. As such, the part of the convex output window which is shaped to refract light towards the illuminating surface may be reduced. A further benefit of the tilting of the parabolic edge-wall is that it reduces light to be emitted by the collimator away from the illuminating surface. The illumination system may, for example, be arranged in a luminaire in which the illuminating surface is a diffusely reflective surface reflecting the light from collimator towards a light emission window of the luminaire. Such a light emission window typically is arranged opposite the illuminating surface. In such a configuration, light from the light source preferably should not directly illuminate the light emission window of the luminaire as this direct illuminating of the light emission window may cause glare. By tilting the further symmetry axis towards the illuminating surface, the guidance of the light is generally towards the illuminating surface, reducing the emission of light away from the illuminating surface and towards the light emission window, and thus reducing Glare.

In an embodiment of the illumination system, the further symmetry axis is tilted with respect to the symmetry axis towards the illuminating surface, and wherein the tilting angle between the further symmetry axis and the symmetry axis is in a range between 0.5 degrees and 10 degrees. The angle between the further symmetry axis and the symmetry axis is a trade-off between the redirection of the light toward the illuminating surface and the leakage of light via the edge-wall of the refractive collimator after multiple reflections. This light may be used to illuminate the illuminating surface up to the edge of the illuminating surface. Still, the intensity of this leakage of the light should be limited to maintain a substantially homogeneous illumination of the illuminating surface. As such, in a preferred embodiment, the predefined angle between the further symmetry axis and the symmetry axis may preferably be between 1 and 5 degrees. And in an even further preferred embodiment the angle between the further symmetry axes may be between 2.5 and 3.5 degrees. The inventors have found that an angle at approximately 3 degrees would be preferred as it would provide a substantial reduction of the glare while providing sufficient illumination at the edge of the illuminating surface when using a refractive collimator.

In an embodiment of the illumination system, a first part of the output window comprises a substantially planar part of the output window, the first part being arranged substantially between a first plane and the illuminating surface, the first plane extending through the further symmetry axis and being arranged substantially perpendicular to a second plane extending through the symmetry axis and the further symmetry axis, and wherein a second part of the output window arranged on an opposite side of the first plane compared to the illuminating surface comprises the convex part of the output window for refracting light towards the illuminating surface. From the ray-tracing program the part of the output window between the first plane and the illuminating surface may be designed relatively planar to still generate a substantially homogeneous distribution with the light emitted from that part of the output window. The remainder of the output window is used to redirect light which otherwise would be emitted away from the illuminating surface, back to the illuminating surface. To achieve such a refractive behavior, the remainder of the output window is substantially convexly curved (as is illustrated in FIG. 1B) before intersecting with the edge-wall.

In an embodiment of the illumination system, the output window is substantially symmetric relative to the second plane extending through the symmetry axis and the further symmetry axis.

According to a second aspect of the invention, the object is achieved with a luminaire comprising an illumination system and comprising the illuminating surface.

In an embodiment of the luminaire, the luminaire comprises a plurality of illumination systems, each comprising a light source and a collimator for illuminating a part of the illuminating surface. The plurality of illumination systems together are arranged for illuminating the illuminating surface substantially homogeneously.

In an embodiment of the luminaire, the plurality of light sources are arranged in a row of light sources, and wherein the individual parts illuminated by the individual illumination systems partially overlap, the distribution of the light of the individual illumination systems being arranged for generating an substantially uniform light distribution across the illuminating surface. The intensity at the overlapping part of the individual light distributions of the individual illumination system is reduced to obtain an overall substantially uniform light distribution across the illuminating surface. This may be designed using the well known optical modeling software. Using such an arrangement, a very large luminaire may be generated having a substantially homogeneously illuminated illuminating surface.

In an embodiment of the luminaire, a part of the illuminating surface is a curved surface being concavely shaped with respect to the collimator. The concave shape of the illuminating surface with respect to the collimator is illustrated in FIGS. 2A and 2B. A benefit of this embodiment is that it enables to increase the part of the illuminating surface which is illuminated by the light emitted by the collimator while maintaining the ability to have a substantially homogeneous illumination across the part of the illuminating surface. At a relatively large distance from the collimator, the angle at which the light emitted by the collimator strikes the illuminating surface is relatively large (with respect to a normal axis at the illuminating surface), making it very difficult to obtain a uniform light distribution. By curving the far end of the illuminating surface toward the symmetry axis, the angle at which the light emitted by the refractive collimator strikes the part of the illuminating surface is reduced (measured with respect to the normal at the illuminating surface, thus closer to the normal at the illuminating surface), making it easier to obtain a relatively homogeneous light distribution at this far end of the illuminating surface. Furthermore, the curvature allows reducing the height of the luminaire at the far end of the illumination surface with respect to the collimator.

In an embodiment of the luminaire, the illuminating surface is a reflective surface arranged substantially opposite a light emission window of the luminaire. In such an embodiment of the luminaire the reflective surface may, for example, be arranged to substantially diffusely reflecting light towards the light emission window of the luminaire. This arrangement improves the mixing of the light due to the distance between the illuminating surface and the emission window. Alternatively, the reflective surface may be a substantially specular reflecting surface and the light emission window may comprise, for example, a diffusing layer for diffusing the light before being emitted by the luminaire. The shape of this reflecting illuminating surface is less critical for generating a uniform distribution of the light at the light emission window, thus still resulting in less height compared to the known illumination system.

In an embodiment of the luminaire, the luminaire comprises a light emission window comprising the illuminating surface. In such an embodiment of the luminaire, the light emitted and refracted by the refractive collimator impinges directly on the light emission window of the luminaire. Preferably the light emission window comprises a diffusely translucent layer for diffusing the light before it is emitted by the luminaire. Such an arrangement is preferred because it generally enables the smallest height of the luminaire and avoids an additional reflective surface.

In an embodiment of the luminaire, the illuminating surface and/or the light emission window comprise a luminescent material for converting at least a part of the light emitted by the light source into light of a different color. A benefit of this embodiment is that the use of the luminescent material enables to produce any color of light emitted by the luminaire. Furthermore, the luminescent material may be used as diffusing layer, because the light after having been absorbed by the luminescent material is subsequently emitted by the luminescent material in a substantially Lambertian emission profile. Such an arrangement of the luminescent material is generally known as remote phosphor arrangement and has as a benefit that the range of luminescent materials to choose from is relatively large and the efficiency of the luminescent material is relatively high, all due to the relatively low operating temperatures of the remotely arranged luminescent material and due to the relatively low energy flux through the luminescent material.

BRIEF DESCRIPTION OF THE DRAWINGS

These and other aspects of the invention are apparent from and will be elucidated with reference to the embodiments described hereinafter.

In the drawings:

FIGS. 4A and 4B show a polar plots of the light distribution of the light emitting diode and of the light emitting diode in combination with the collimator, and FIG. 5 shows a schematic cross-sectional view of a display device according to the invention comprising the luminaire as backlighting system.

The figures are purely diagrammatic and not drawn to scale. Particularly for clarity, some dimensions are exaggerated strongly. Similar components in the figures are denoted by the same reference numerals as much as possible.

DETAILED DESCRIPTION OF EMBODIMENTS

Figure 1A:
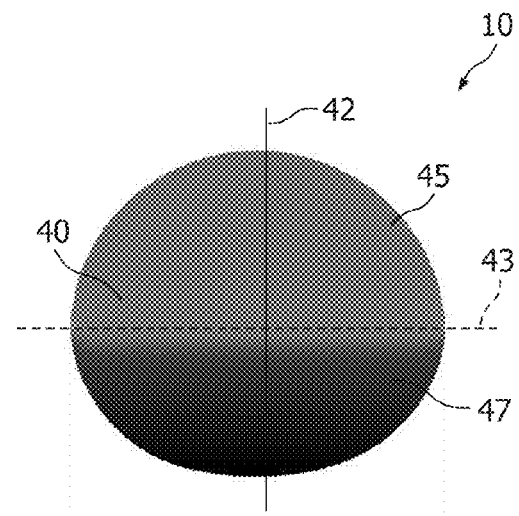
FIGS. 1A, 1B and 1C show a schematic front view, cross-sectional view and rear view of an illumination system according to the invention.
Figure 1B:
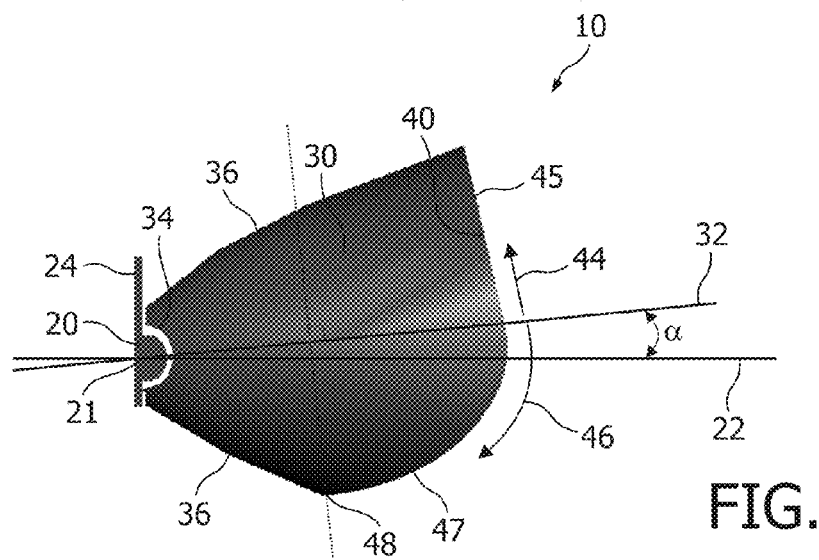
Figure 1C:
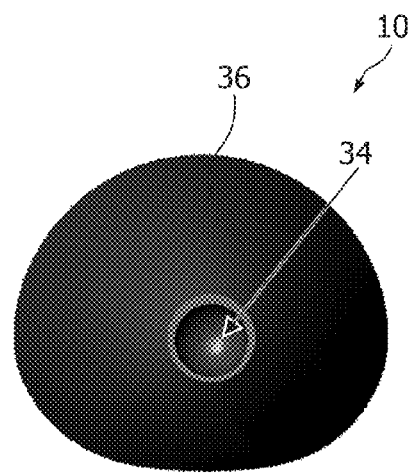

FIGS. 1A, 1B and 1C show a schematic front view (FIG. 1A), cross-sectional view (FIG. 1B) and rear view (FIG. 1C) of an illumination system 10 according to the invention. The illumination system 10 comprises a light source 20 (see FIG. 1B) and a collimator 30, preferably a refractive collimator 30. The light source 20 emits light at a substantially Lambertian emission distribution arranged around a symmetry axis 22. Such a light source 20 may, for example, be a light emitting diode 20 (further also indicated as LED). The light emitted by the light emitting diode 20 enters the refractive collimator 30 via a concave input window 34 and is emitted from the refractive collimator 30 at least partially via the light output window 40. The concave input window 34 preferably is a substantially spherical input window 34 in which a focal point 21 of the concave input window 34 is located substantially at the center of the light source 20. Such an arrangement allows an efficient in-coupling of the light emitted by the light source 20 into the refractive collimator 30. The output window 40 is at least partially convex 47 and is shaped to refract part of the light emitted from the output window towards an illuminating surface 50, 52 (see FIGS. 2A and 2B). In operation the illumination system 10 illuminates at least a part 51 (see FIGS. 2A and 2B) of the illuminating surface 50, 52. This homogeneously illuminated part 51 of the illuminating surface 50, 52 is at least partially arranged substantially parallel to the symmetry axis 22. The light emitted by the light source 20 and impinging on the illuminating surface 50, 52 via the refractive collimator 30 illuminates at least a part 51 of the illuminating surface 50, 52 substantially homogeneous. The shape of the output window 40 is chosen such that the part 51 of the illuminating surface 50, 52 is illuminated substantially homogeneously. The determining of the specific shape to obtain a predetermined homogeneous illumination of the part 51 of the illuminating surface 50, 52 may be obtained using well known optical modeling software, also known as ray-tracing programs, such as ASAP®, lighttools®, etc.

The use of the refractive collimator 30 for redirecting the light emitted by the LED 20 towards at least a part 51 of the illuminating surface 50, 52 of which at least a part is arranged substantially parallel to the symmetry axis 22 generates additional design freedom for a designer of such an illumination system 10. In the known illumination systems the light of the LED is spread over a surface using a specifically shaped mirror. A drawback of the use of the mirror is that the three-dimensional modeling of the reflective mirror is relatively difficult. Furthermore, the three-dimensional modeling of the reflective mirror may require additional height of the known illumination system to allow the reflective mirror to substantially uniformly illuminate the surface. In the illumination system 10 according to the invention, the illumination system 10 comprises a refractive collimator 30 for redirecting the light emitted by the LED 20 to substantially uniformly illuminate part 51 of the illuminating surface 50, 52. The shape of the output window 40 may be designed using the optical modeling software, to refract at least a part of the light emitted by the LED 20 toward the illuminating surface 50, 52. The production of such a refractive collimator 30 may be done via well known molding techniques, and via such molding techniques, the refractive collimator 30 may relatively easily be produced in large numbers. Although the positioning of the refractive collimator 30 with respect to the illuminating surface 50, 52 is relatively critical to obtain a good uniformity across the part of the illuminating surface 50, 52, it still allows substantially any light distribution across the part 51 of the illuminating surface 50, 52 by just controlling the shape of the output window 40 of the refractive collimator 30. When using such a refractive collimator 30 in the illumination system 10, a height h (see FIGS. 2A and 2B) of the illumination system 10 which is a dimension of the illumination system 10 in a direction substantially perpendicular to the symmetry axis 22, typically depends on the dimensions of the refractive collimator 30 in the direction parallel to the height h. This is typically smaller compared to the height which would be required when the uniform distribution of the light is to be generated using a reflecting mirror—as is shown in the known illumination system. As such, the illumination system 10 according to the invention provides an increased design freedom to an optical designer to achieve a substantially uniform distribution of the light over a part 51 of the illuminating surface 50, 52 while limiting the height h of the illumination system 10.

Between the input window 34 and the output window 40 an edge-wall 36 is arranged. In between the input window 34 and a boundary edge 48, the edge-wall 36 of the collimator is substantially symmetric around a further symmetry axis 32. In a cross-sectional view through the further symmetry axis 32 of the refractive collimator 30, the edge-wall 36 has a substantial parabolic shape. Such a parabolic shape is used to guide light from the input window 34 to the output window 40 of the refractive collimator 30 via total internal reflection. Because total internal reflection is substantially loss-less, the guidance using total internal reflection provides a very efficient way of guiding light through the refractive collimator 30. The further symmetry axis 32 and the symmetry axis 22 intersect substantially at a focal point 21 of the concave input window 34 being substantially at the center of the LED 20. The further symmetry axis 32 is tilted with respect to the symmetry axis 22 over a predefined angle α around the intersection point. The tilting of the further symmetry axis 32 is in a direction of the illuminating surface 50, 52 over the predefined angle α. Due to the tilting of the further symmetry axis 32, light guided by the refractive collimator 30 is already guided more towards the illuminating surface 50, 52 thus reducing the light which may be emitted from the refractive collimator 30 away from the illuminating surface 50, 52. The predefined angle α is in a range between 0.5 degrees and 10 degrees. Preferably, the predefined angle α is between 1 degrees and 5 degrees, and even more preferably the predefined angle α is between 2.5 degrees and 3.5 degrees. The choice of the predefined angle α depends on a trade-off between the redirection of the light toward the illuminating surface 50, 52 and the leakage of light via the edge-wall 36 of the refractive collimator 30, for example, after multiple reflections inside the refractive collimator 30 (shown in FIG. 3A). A part of the leaked light may be used to illuminate a part of the illuminating surface 50, 52 arranged near the refractive collimator 30 (see item 56 in FIG. 2B). Still, the intensity of this light leakage should be limited to maintain a substantially homogeneous illumination of the illuminating surface. As such, the inventors have found that the predefined angle α of approximately 3 degrees would be preferred as it would provide a sufficient illumination at the edge 52 of the illuminating surface 50, 52.

The output window 40 of the refractive collimator 30 comprises a first part 44 and a second part 46 (see FIG. 1B). The first part 44 is substantially arranged between a first plane 43 and the illuminating surface 50, 52 and comprises a substantially planar part 45 of the output window 40 of the refractive collimator 30. The first plane 43 extends through the further symmetry axis 32 and is arranged substantially perpendicular to a second plane 42 which extends through the symmetry axis 22 and the further symmetry axis 32. The second part 46 is arranged at an opposite side of the first plane 43 compared to the first part 44, and comprises a convexly curved part 47 of the output window 40 for refracting light towards the illuminating surface 50, 52. The output window 40 may further be arranged symmetrically with respect to the second plane 42 (see FIG. 1A) which extends through the symmetry axis 22 and the further symmetry axis 32.

Figure 2A:
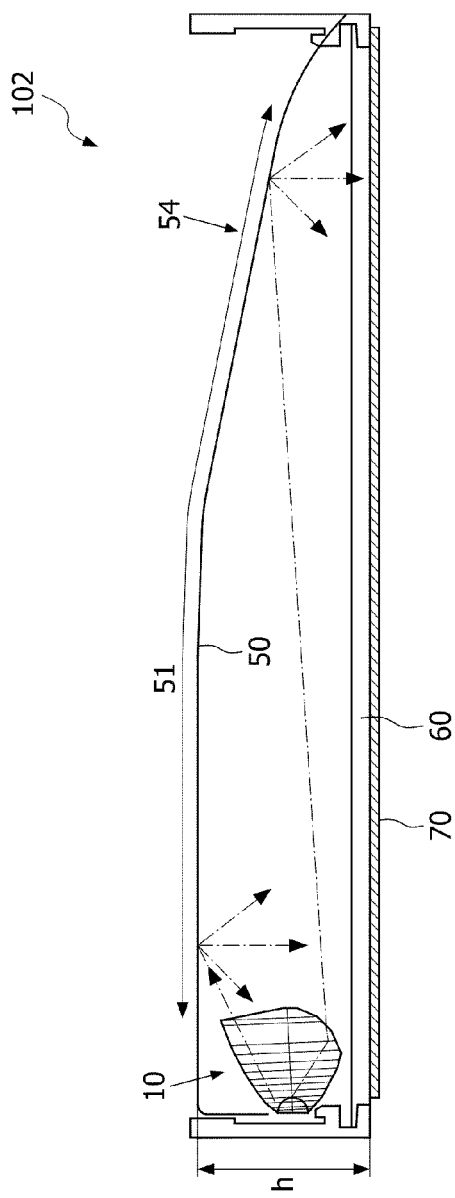
FIGS. 2A and 2B show schematic cross-sectional views of a luminaire comprising the illumination system according to the invention.
Figure 2B:
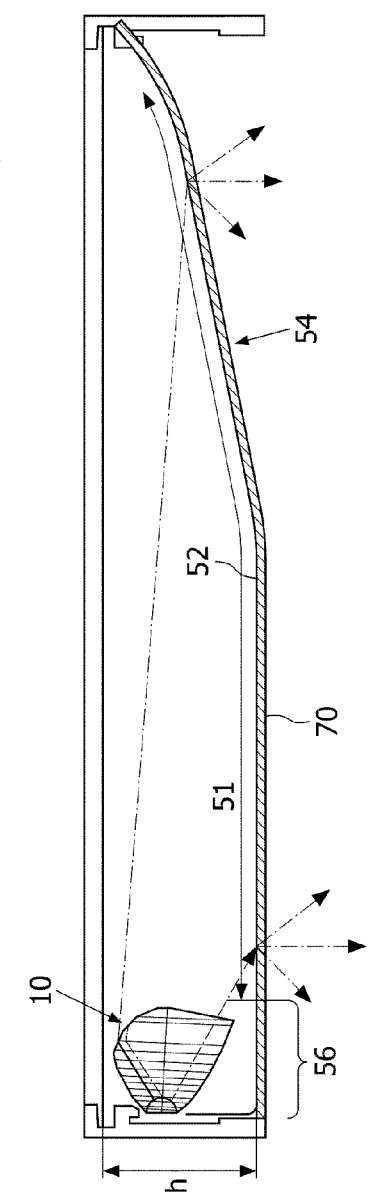

FIGS. 2A and 2B show schematic cross-sectional views of a luminaire 102, 104 comprising the illumination system 10 according to the invention. The luminaire 102, 104 comprises the illumination system 10 and the illuminating surface 50, 52. As can be seen from the schematic cross-sectional views of the luminaires 102, 104 of FIGS. 2A and 2B, a part of the illuminating surface 50, 52 is arranged substantially parallel to the symmetry axis 22. The wording "substantially parallel to the symmetry axis" is chosen to indicate that the part of the illuminating surface 50, 52 may define an angle with the symmetry axis 22 to within ±10 degrees. Preferably the illuminating surface 50, 52 is parallel to the symmetry axis 22 because in such an arrangement the range over which the light spreads across the illuminating surface 50, 52 may be largest. In such a configuration, a base 24 (see FIG. 1B) of the LED 20, is arrange substantially perpendicular to the at least part of the illuminating surface 50, 52. At a far end of the illuminating surface 50, 52, relatively far away from the refractive collimator 30, the illuminating surface 50, 52 may be curved concavely with respect to the refractive collimator 10 (as shown in FIGS. 2A and 2B—indicated with reference number 54) to enable a uniform light distribution also at a relatively large distance from the refractive collimator 30. Alternatively, the light source 20 (together with the refractive collimator 30) may be tilted over a relatively small angle, for example, up to 10 degrees towards the illuminating surface 50, 52. Such a tilting of the illumination system 10 generally requires an adaptation of the shape at least partially convex output window 40 of the refractive collimator 30 to ensure a uniform light distribution across the illuminated part of the illuminating surface 50. For example, the substantially planar first part 44 (see FIG. 1B) may also be curved (not shown) to refract light such that the distribution of the light across the illuminating surface 50, 52 is substantially uniform.

FIG. 2A shows a first embodiment of the luminaire 102 in which the illuminating surface 50 is a reflective surface 50 arranged substantially opposite to a light emission window 60. The reflective surface 50 may comprise, for example, a diffusing layer 50 which reflects the impinging light from the illumination system 10 into diffusely reflected light towards the light emission window 60. As such, the distance between the reflective illuminating surface 50 and the light emission window 60 enables an increased mixing of the light emitted by the luminaire 102.

FIG. 2B shows a second embodiment of the luminaire 104 in which the illuminating surface 52 coincides with the light emission window 60 of the luminaire 104. A benefit is that this configuration typically allows the height h of the luminaire 104 to be further reduced. Furthermore, the efficiency of this embodiment may be larger as no reflective surface is required to substantially homogeneously illuminate the illuminating surface 52. Generally at each reflection some light is lost. By arranging the refractive collimator 30 such that the light emitted by the refractive collimator 30 substantially uniformly illuminates the illuminating surface 52 being the light emission window 60 a reflection for coupling out the light from the luminaire 104 is prevented thus improving the efficiency.

Preferably the light emission window 60 comprises a diffusing layer or diffusing material for diffusing the light emitted by the luminaire 104.

In the embodiment of the illumination system 102, 104 as shown in FIGS. 2A and 2B the illuminating layer 50, 52 and/or the light emission window 60 may comprise a layer 70 comprising a luminescent material 70 or may comprise a mixture of a plurality of different luminescent materials 70. The luminescent layer 70 is further also indicated as remote phosphor layer 70. In the embodiment shown in FIG. 2A the remote phosphor layer 70 is applied to the light emission window 60. A benefit of this embodiment is that the remote phosphor layer 70 may be applied relatively easily, for example, before assembling the light emission window 60 to the illumination system 102. However, the luminance uniformity at the light emission window 60 is relatively strongly dependent on the uniformity of the luminescent material 70 in the remote phosphor layer 70. Alternatively, the luminescent material 70 may be arranged as a layer on the illuminating surface 50 of the luminaire 102 (not shown). In such an embodiment, the distance between the remote phosphor layer 70 and the light emission window 60 is relatively large, allowing a mixing of the light generated by the luminescent material 70 before being emitted by the luminaire 102. In such an arrangement the uniformity of the emitted light is less dependent on the uniformity of the luminescent material 70. Even further alternatively, both the illumination surface 50 and the light emission window 60 comprise a luminescent material 70 (not shown) which may even be different (mixtures of) luminescent materials 70. The so called remote phosphor configuration has as a benefit that the efficiency of the luminescent material is improved and that the range of luminescent materials to choose from is improved. Both beneficial effects of the remote phosphor configuration are caused from the fact that in the typical remote phosphor configuration the operating temperature of the phosphor and the light flux through the phosphor is generally lower compared to the configuration in which the luminescent material is applied directly on the light source 20 (not shown).

In an embodiment, the light source 20 emits substantially blue light. Part of the blue light will be converted, for example, using $Y_3Al_5O_{12}:Ce^{3+}$ (further also referred to as YAG:Ce) which converts part of the blue impinging light into yellow light. Choosing a specific density of the luminescent material 70 causes a predetermined part of the impinging blue light to be converted into yellow, determining the color of the light emitted by the luminaire 102, 104. The ratio of blue light which is converted by the luminescent material 70 may, for example, be determined by a layer thickness of the remote phosphor layer 70, or, for example, by a concentration of the YAG:Ce particles distributed in the remote phosphor layer 70. Alternatively, for example, CaS:Eu$^{2+}$ (further also referred to as CaS:Eu) may be used, which converts part of the blue impinging light into red light. Adding some CaS:Eu to the YAG:Ce may result in white light having an increased color temperature.

Alternatively, the light source 20, for example, emits ultraviolet light which is converted by the luminescent material 70 into substantially white light. For example a mixture of BaMgAl$_{10}$O$_{17}$:Eu$^{2+}$ (converting ultraviolet light into blue light), Ca$_8$Mg(SiO$_4$)$_4$Cl$_2$:Eu$^{2+}$,Mn$^{2+}$ (converting ultraviolet light into green light), and Y$_2$O$_3$:Eu$^{3+}$,Bi$^{3+}$ (converting ultraviolet light into red light) with different phosphor ratios may be used to choose a color of the light emitted from the luminaire 102, 104 which lies in a range from relatively cold white to warm white, for example between 6500K and 2700K. Other suitable luminescent materials 70 may be used to obtain a required color of the light emitted by the luminaire 15.

The luminaire 102, 104 may comprise a plurality of light sources 20 (not shown) each comprising a refractive collimator 30 (not shown), for example, arranged in a row (not shown) to illuminate at least a part of the illuminating surface 50, 52 substantially uniform. Using a plurality of illumination systems 10, a relatively large illuminating surface 50, 52 may substantially uniformly be illuminated. Generally, an adaptation of the shape of the output window 40 of the individual refractive collimators 30 may be required to ensure that the light distribution across the illuminating surface 50, 52 remains substantially uniform, also at parts of the illuminating surface 50, 52 where the light of two or more light sources 20 overlap.

Figure 3A:
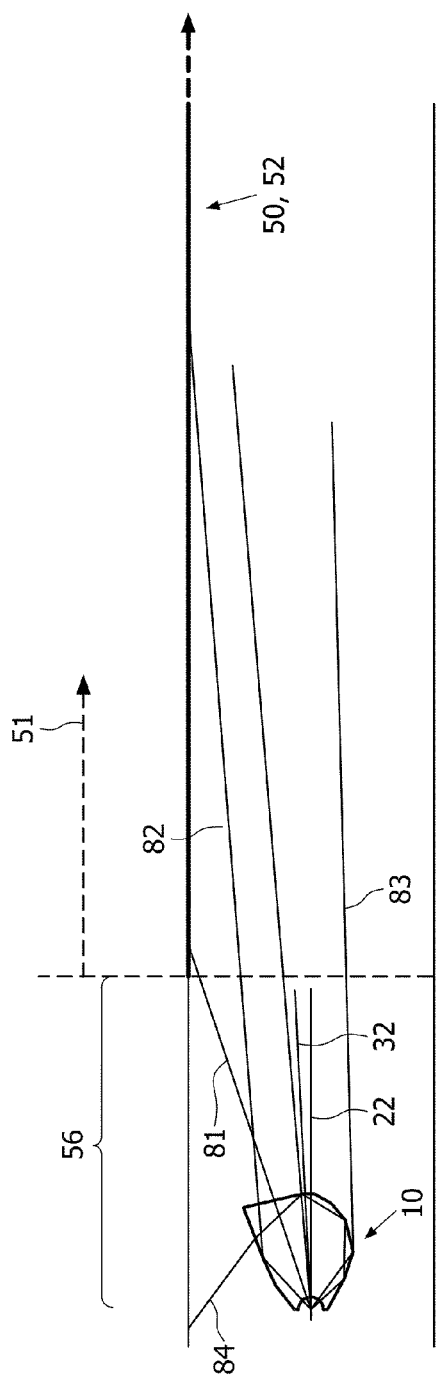
FIGS. 3A and 3B show a uniformity distribution across the illuminating surface due to the illumination system according to the invention.
Figure 3B:
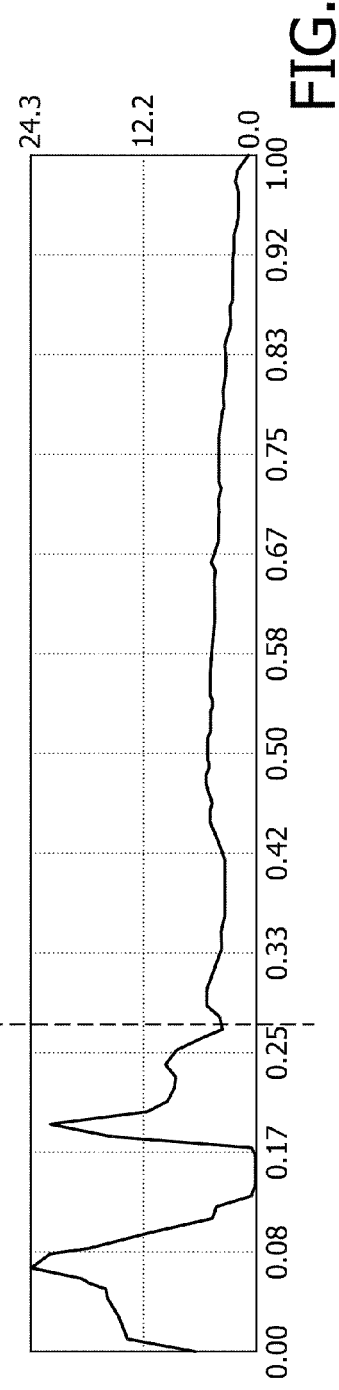

FIGS. 3A and 3B show a uniformity distribution across the illuminating surface 50, 52 due to the illumination system 10 according to the invention. FIG. 3A shows the illumination system 10 arranged in a luminaire, and shows some of the light rays 81, 82, 83, 84 emitted by the light source 20. The light rays indicated with reference numbers 81, 82 and 83 are collimated and refracted such that they impinge on the illuminating surface 50, 52 to generate a substantially uniformly illuminated part 51 of the illuminating surface 50, 52. The light ray indicated with reference number 81 is merely refracted at the first part 44 of the output window 40 of the refractive collimator 30. The light ray indicated with reference number 82 is reflected from the edge-wall 36 of the refractive collimator 30 via total internal reflection after which the light ray is redirected towards the illuminating surface 50, 52. The light ray indicated with reference number 83 is refracted from the convexly shaped part 47 of the refractive collimator 30. From FIG. 3A it can clearly be seen that the shape of the convexly shaped part 47 of the output window 40 of the refractive collimator 30 is chosen such that the light ray having reference number 83 is redirected from a direction in which the light progresses away from the illuminating surface 50, 52 to a direction in which the light progresses towards the illuminating surface 50, 52. In such a way, the light emitted by the light source 20 and progressing in a direction away from the illuminating surface 50, 52 may be redirected by the curvature of the convexly shape part 47 of the output window 40 such that this light contributes to the illumination of the illuminating surface 50, 52. The exact shape of the convexly shaped part 47 of the output window 40 may be determined using optical modeling software such that the uniformity of at least a part 51 of the illuminating surface 50, 52 is substantially uniformly illuminated.

The light ray having reference number 84 is scattered multiple times inside the refractive collimator 30 and eventually leaves the refractive collimator at a surface different from the output window 40. This light ray 84 represents stray light which may be used to illuminate a part of the illuminating surface 50, 52 which is arranged near the refractive collimator 30. In known illumination systems, the base of the light source is often arranged substantially parallel to the illuminating surface 50, 52 and thus the area 56 of the illuminating surface 50, 52 arranged underneath the base will not be illuminated as it is shielded by the base. In the illumination system 10 according to the invention the base 24 is arranged substantially perpendicular to the illuminating surface 50, 52 such that stray light may illuminate the part 56 near the illumination system 10, preventing dark areas on the illuminating surface 50, 52.

FIG. 3B shows an example of a light intensity distribution generated by the illumination system 10 according to the invention. The part 51 of the illuminating surface 50, 52 which is substantially uniformly illuminated is indicated with a dashed arrow. As can be seen from the plot shown in FIG. 3B the light intensity distribution across the part 51 of the illuminating surface 50, 52 is substantially uniform. Furthermore, the area 56 of the illuminating surface 50, 52 near the illumination system 10 is illuminated via stray light. From the distribution shown in FIG. 3B additional measures are required to reduce the intensity at the area 56 near the illumination system 10 and to further improve the uniformity at this area 56 near the illumination system 10.

FIGS. 4A and 4B show a polar plots of the light distribution of the light emitting diode 20 (FIG. 4A) and of the light emitting diode 20 in combination with the collimator 30 (FIG. 4B). The emission distribution of the light emitting diode 20 as shown in FIG. 4A is a substantially Lambertian light distribution in which the orientation of the light emitting diode 20 substantially coincides with the arrangement of the illustrated light emitting diode 20 in FIG. 4A. Also the orientation of the refractive collimator 30 is shown in FIG. 4B, and the light distribution shown in the polar plot of FIG. 4B corresponds to this orientation. The illuminating surface 50, 52 (only part of the illuminating surface 50 is shown in FIG. 4B) would be arranged in the upper right quadrant of the polar plot shown in FIG. 4B and may be either a light reflective surface 50 which subsequently reflects the impinging light towards the light emission window 60 (see FIG. 2A), or which may be at least a part of the light emission window 60 (see FIG. 2B). Due to the combination of the light emitting diode 20 and the refractive collimator 30, the substantially Lambertian light distribution (of FIG. 4A) is converted into a distribution in which the illuminating surface 50, 52 substantially homogeneously is illuminated. As can be seen from the polar plot of FIG. 4B, the convex part 47 (see FIG. 1) of the refractive collimator 40 redirects light, which is emitted by the light emitting diode 20 in a direction away from the illuminating surface 50, 52 (lower right quadrant of the polar plot of FIG. 4A), now is redirected towards the illuminating surface 50, 52 (being the upper right quadrant of the polar plot of FIG. 4B).

FIG. 5 shows a schematic cross-sectional view of a backlighting system 210 and display device 200 according to the invention. The display device 200 may, for example, be a liquid crystal display device 200 which comprises a layer of electrically connected (not shown) liquid crystal cells 212, a polarizing layer 214, and an analyzing layer 216. Alternatively, the display device 200 may be any other non-emissive display device 200.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. Illumination system comprising:
   a light source for emitting light with a basic emission distribution around a symmetry axis, and
   a collimator for redirecting light from the light source to substantially homogeneously illuminate at least a part of an illuminating surface, at least a part of the homogeneously illuminated illuminating surface extending substantially parallel to the symmetry axis, the collimator comprising a concave input window for receiving light from the light source, and further comprising an at least partially convex output window for directing light towards the illuminating surface, a convex part of the output window being shaped for refracting light emitted by the light source in a direction away from the illuminating surface back towards the illuminating surface and for generating an altered emission distribution being asymmetric with respect to the symmetry axis of the basic emission distribution to substantially homogeneously illuminate the at least part of the illuminating surface, wherein the collimator comprises an edge-wall arranged between the input window and the output window, in between the input window and a boundary edge the edge-wall being arranged substantially symmetric around a further symmetry axis, and comprising a substantially parabolic shape in a cross-section through the further symmetry axis, wherein the further symmetry axis of the collimator and the symmetry axis of the emission distribution intersect substantially at a focal point of the concave input window, and wherein the further symmetry axis is tilted with respect to the symmetry axis of the emission distribution over a tilting angle.

2. Illumination system as claimed in claim 1, wherein the further symmetry axis is tilted with respect to the symmetry axis towards the illuminating surface, and wherein the tilting angle between the further symmetry axis and the symmetry axis is in a range between 0.5 degrees and 10 degrees.

3. Illumination system as claimed in claim 1, wherein a first part of the output window comprises a substantially planar part of the output window, the first part being arranged substantially between a first plane and the illuminating surface, the first plane extending through the further symmetry axis and being arranged substantially perpendicular to a second plane extending through the symmetry axis and the further symmetry axis, and wherein a second part of the output window arranged on an opposite side of the first plane compared to the illuminating surface comprises the convex part of the output window for refracting light towards the illuminating surface.

4. Illumination system as claimed in claim 1, wherein the output window is substantially symmetric relative to the second plane extending through the symmetry axis and the further symmetry axis.

5. Luminaire comprising an illumination system as claimed in claim 1, and comprising the illuminating surface.

6. Luminaire as claimed in claim 5, wherein the luminaire comprises a plurality of illumination systems, each comprising a light source and a collimator for illuminating a part of the illuminating surface, the plurality of illumination systems together are arranged for illuminating the illuminating surface substantially homogeneously.

7. Luminaire as claimed in claim 6, wherein the plurality of light sources are arranged in a row of light sources, and wherein the individual parts illuminated by the individual illumination systems partially overlap, the distribution of the light of the individual illumination systems being arranged for generating an substantially uniform light distribution across the illuminating surface.

8. Luminaire as claimed in claim 5, wherein a part of the illuminating surface is a curved surface being concavely shaped with respect to the collimator.

9. Luminaire as claimed in claim 5, wherein the illuminating surface is a reflective surface arranged substantially opposite a light emission window of the luminaire.

10. Luminaire as claimed in claim 5, herein the luminaire comprises a light emission window comprising the illuminating surface.

11. Luminaire as claimed in claim 5, wherein the illuminating surface and/or the light emission window comprise a luminescent material for converting at least a part of the light emitted by the light source into light of a different color.

12. Illumination system comprising:
    a light source for emitting light with a basic emission distribution around a symmetry axis, and
    a collimator for redirecting light from the light source to substantially homogeneously illuminate at least a part of an illuminating surface, at least a part of the homogeneously illuminated illuminating surface extending substantially parallel to the symmetry axis, the collimator comprising a concave input window for receiving light from the light source, and further comprising an at least partially convex output window for directing light towards the illuminating surface, a convex part of the output window being shaped for refracting light emitted by the light source in a direction away from the illuminating surface back towards the illuminating surface and for generating an altered emission distribution being asymmetric with respect to the symmetry axis of the basic emission distribution to substantially homogeneously illuminate the at least part of the illuminating surface, wherein the collimator comprises an edge-wall arranged between the input window and the output window, in between the input window and a boundary edge the edge-wall being arranged substantially symmetric around a further symmetry axis, and comprising a substantially parabolic shape in a cross-section through the further symmetry axis, wherein a first part of the output window comprises a substantially planar part of the output window, the first part being arranged substantially between a first plane and the illuminating surface, the first plane extending through the further symmetry axis and being arranged substantially perpendicular to a second plane extending through the symmetry axis arid the further symmetry axis, and wherein a second part of the output window arranged on an opposite side of the first plane compared to the illuminating surface comprises the convex part of the output window for refracting light towards the illuminating surface.

* * * * *